3,005,758
METHOD OF AND APPARATUS FOR ELECTRO-CHEMICAL GAS ANALYSIS
Stanford B. Spracklen, Hurricane, Donald N. Campbell, St. Albans, and Charles G. Fellows, Charleston, W. Va., assignors to Union Carbide Corporation, a corporation of New York
Filed Feb. 13, 1956, Ser. No. 564,972
6 Claims. (Cl. 204—1)

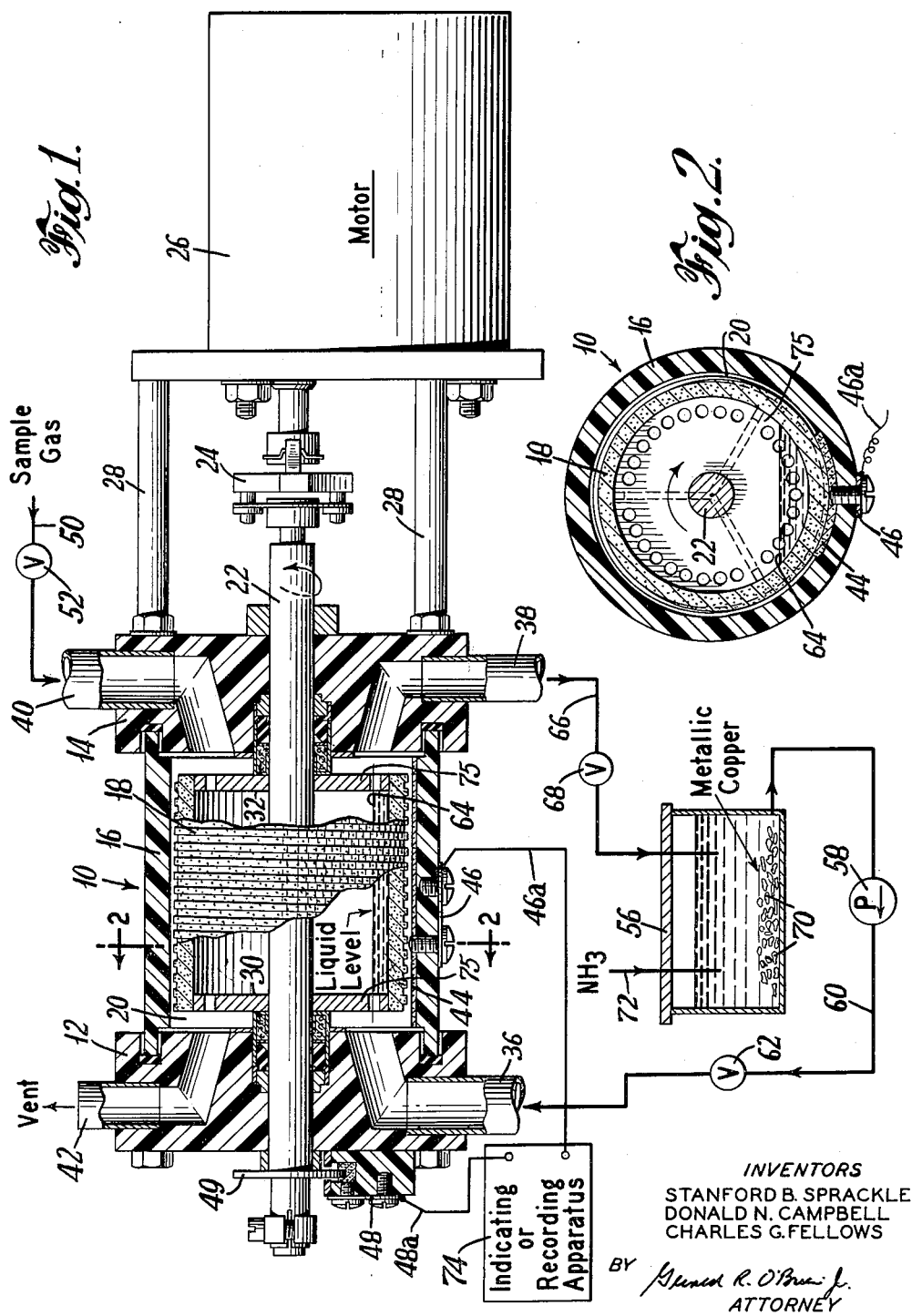

The present invention relates to a method and apparatus for the continuous measurement of one constituent in a stream of process gas, referred to hereinafter as the "sample gas."

In the continuous analysis of constituents of a gaseous mixture with an instrument having a full scale range of 100 parts per million, the problem of sorting out—and in some way tagging and counting—so few parts in so many becomes extremely difficult.

Heretofore, a method of analyzing sample gas mixtures for detecting and quantitatively measuring for one constituent of the mixture in the parts per million range has been proposed employing what may be referred to as the "concentration cell" principle. A concentration cell is one in which two bodies of electrolyte, one having an ionic content different from the other in magnitude and/or kind, are placed together so that a liquid interface obtains and an ionic gradient exists across this interface which causes an electrical potential to occur between two electrodes of the same material, one of which is contacted with each body of electrolyte. Most prior apparatus based on the concentration cell principle employed heretofore was not applicable to the continuous measurement for one constituent of a flowing sample gas mixture due to the difficulties encountered in maintaining a definite interface between the two electrolyte components of the cell. In those few prior apparatus proposed for continuous measurement, the requirement of maintaining a definite interface between the two electrolyte components of the cell was so critical that diffusion barriers, such as salt bridges, diaphragms, or the like, were almost always required to separate the two electrolyte components. This resulted in low speed response and complicated apparatus.

Another prior method was proposed employing photochemical means for quantitatively measuring for one constituent of a sample gas mixture. This method is disclosed and claimed in U.S. patent application Serial No. 374,941 now abandoned, filed August 17, 1953 by S. B. Spracklen and C. G. Fellows. As disclosed therein, a method is provided for continuously analyzing for parts per million of oxygen in a sample gas mixture by measuring the relative change in turbidity effected in a reagent solution by chemical reaction with the oxygen contained in the sample gas. Although such method provided a continuous measurement of oxygen content in the parts per million range, it presented the difficulty of having an inherently slow response time. The measurement principle there involved required, for effective measurement, a high ratio of sample gas flow to reagent solution flow which, in turn, necessitated a large liquid hold-up time and resulted in a slow speed of response of the analyzer. Accordingly, if rapid changes in oxygen gas content were effected in the sample gas, an indication of such changes could not be made for a considerable time period after the change. This means that such a method and apparatus was limited in utility to use with systems in which only slow uniform changes or drifts occurred, and was not capable of use with systems which provided large, rapid changes in the sample gas being measured for oxygen content.

It is, therefore, the prime object of the present invention to provide a method of and apparatus for the continuous detection and quantitative determination of one constituent in the parts per million range of a mixture of gases, which method affords a rapid time response, and which apparatus is simple and rugged in construction.

In accordance with the method of the present invention, a rotatable electrode is partially immersed in a body of reagent electrolyte solution the composition of the electrode being such that it does not react with the solution or the gas sample, the solution being selected for its ability to change in ionic content upon contact with a selected constituent of a sample gas mixture. The partially immersed electrode is rotated at a substantially constant speed to form a thin continuous surface film of the reagent electrolyte solution covering the unimmersed surface of the rotatable electrode. A stream of the sample gas mixture is contacted with this thin continuous surface film of reagent solution to effect a change in the ionic content of the solution. When rotation of the electrode returns the thin surface film of treated reagent electrolyte solution to the body of reagent electrolyte solution, a dynamic concentration cell is completed between rotating electrode and a stationary probe electrode which is immersed in the body of reagent electrolyte solution. The two bodies of electrolyte positioned between these electrodes, and having a common liquid interface, consist of the treated thin surface film of reagent and the body of untreated reagent. The electrical potential developed between the electrodes serves as a quantitative measurement of the concentration of selected constituent of the sample gas mixture passed in contact with the thin surface film of reagent solution. The electrodes employed should be composed of material substantially non-reactive with the reagent electrolyte solution employed as well as to the contituent of the sample gas mixture to be measured for. Unless he electrode materials are inert to this extent, corrosion, or other chemical reactions with the solution, will result in erratic operation and a faulty measurement.

The reagent electrolyte solution employed must be selected in terms of the constituents of the sample gas mixture and will, of course, be selected so as to be affected in ionic content only by the constituent to be measured for and not by the other constituents of the sample gas mixture. For example, a solution of ammoniacal ammonium chloride containing cuprous ammonium ions may be employed as the reagent for quantitatively measuring the oxygen gas content of the sample gas mixture not having other constituents capable of chemically reacting with that solution or capable of oxidizing the cuprous ammonium ions to cupric ions. The hydrogen chloride content of a gas mixture can be removed from the mixture by contacting with water and the ionic difference between the water before and after contact can be calibrated as the hydrogen chloride concentration of the sample gas mixture, provided that the sample gas mixture does not contain other ionizable constituents. Carbon dioxide and other gases may be removed from a gas mixture by employing a suitable contacting solution and a concentration measurement can be effected. The method is, therefore, operable for a large number of concentration measurements.

Apparatus suitable for performing the method of the invention is shown in the drawings wherein:

FIG. 1 is a combined partial sectional view of the cell block and drive means assembly embodying the invention, and a schematic flow diagram of a cyclic system employed for the measurement of oxygen gas concentration in a sample gas mixture; and FIG. 2 is a sectional view of the apparatus taken along the line 2—2 of FIG 1.

The operation of the apparatus will be described hereinbelow with respect to the analysis of a sample gas mixture for oxygen concentration in the parts per million range.

Referring specifically to the drawings, a closed measuring cell block 10 is provided and comprises end portions 12 and 14 of plastic, or other suitable inert material and a central cylindrical hollow portion 16 of similar material. A rotatable cylindrical electrode 18 of carbon, or other suitable material, is positioned in the chamber 20 of cell block 10 and is rotatably mounted therein on shaft 22, which passes through end portions 12 and 14 of the cell block 10, and is coupled at 24 to drive motor means 26 positioned externally of the cell block 10 and preferably mounted thereto as by connecting rods 28. Packing means 30 and 32 are provided for sealing the interior of chamber 20 at the points where shaft 22 passes through the end portions 12 and 14 of the cell block 10. Cell block 10 is also provided in the lower portion thereof with reagent inlet conduit means 36 for introducing reagent electrolyte solution into the interior of chamber 20 and reagent outlet conduit means 38 for passing reagent electrolyte solution from chamber 20. In the upper portion of cell block 10, sample gas inlet conduit 40 and sample gas outlet conduit 42 are provided for continuously passing the stream of sample gas mixture through the upper portion of chamber 20 in contact with the unimmersed surface of rotatable electrode 18. A stationary electrode 44, the same material as rotatable electrode 18, is provided in the lower portion of chamber 20 and is in electrical contact with terminal 46 from which point a line 46a is connected to one terminal of an indicating or recording apparatus 74. Electrical contact is maintained between rotatable electrode 18 and cell block terminal 48 through conductive elements 75 upon which the electrode 18 is mounted, conductive shaft 22, and rotating contactor 49, and a second line 48a is connected to the other inlet terminal of the indicating or recording apparatus 74.

As shown in FIG. 1, an oxygen-containing sample gas mixture passes into the system through line 50, containing flow control means 52, and enters sample gas inlet conduit 40 of the cell block 10. The sample gas mixture is passed through chamber 20 of the cell block 10 in contact with the thin surface film of reagent formed on the unimmersed portion of rotatable electrode 18. Concurrently therewith a stream of ammoniacal ammonium chloride electrolyte solution containing cuprous ammonium ions is driven from reservoir 56 by pump 58 through line 60 to the reagent electrolyte solution inlet conduit 36 of cell block 10. The rate of flow is controlled by flow control means 62 in line 60 so as to provide the desired level 64 of solution in chamber 20 of cell block 10 and thereby partially immerse rotatable electrode 18 in a body of the reagent electrolyte solution.

As the sample gas mixture enters the upper portion of chamber 20 and contacts the thin surface layer of reagent solution on the surface of rotatable electrode 18, it is discharged through outlet conduit 42 of the cell block 10 to a suitable vent. The body of reagent electrolyte solution maintained at level 64 in chamber 20 is continuously circulated through the closed liquid reagent system which is completed from the cell block through outlet reagent conduit 38 and line 66, containing flow controller 68, to the reservoir. The reservoir 56 comprises a closed vessel, containing metallic copper 70, in the form of turnings or small pieces of scrap, which, upon contacting the cupric ions of the treated reagent electrolyte solution, causes them to be reduced to cuprous ions. In this manner, the entire reagent electrolyte solution is restored to the untreated condition (containing only cuprous ions) which may then be pumped back through the liquid system through line 60, thereby permitting continuous oxygen gas analysis employing a closed reagent electrolyte solution system. Ammonia lost in the system may be replenished by additions from an external supply to the reservoir 56 through line 72.

The apparatus of the embodiment of the drawing may be employed for the continuous measurement of one constituent of a wide variety of sample gas mixtures by merely changing the selection of reagent electrolyte solution since the apparatus is constructed of materials such as plastic, glass and carbon which are inert to most compositions.

What is claimed is:

1. A method for continuously measuring the concentration of a selected constituent in a sample gas mixture stream which comprises partially immersing a rotatable electrode in a body of reagent electrolyte solution selected to change in ionic content upon contacting said selected constituent the composition of the electrode being such that it is non-reactive with the solution and the gas sample, rotating said partially immersed electrode at a substantially constant speed to form a thin continuous surface film of said reagent electrolyte solution covering the unimmersed surface of said rotatable electrode, concurrently passing said sample gas mixture stream in contact with said thin continuous surface film of reagent electrolyte solution to effect a change in the ionic content thereof and form a dynamic concentration cell having a liquid interface, and measuring the potential developed between said rotatable electrode and said body of reagent electrolyte solution as an indication of the concentration of said selected constituent in said sample gas mixture.

2. A method in accordance with claim 1 for measuring the oxygen gas content of a sample gas mixture, wherein said untreated reagent electrolyte solution comprises an ammoniacal ammonium chloride solution containing cuprous ammonium ions.

3. A method for continuously measuring the concentration of a selected constituent in a sample gas mixture stream which comprises partially immersing a rotatable electrode in a body of reagent electrolyte solution selected to change in ionic content upon contacting said selected constituent the composition of the electrode being such that it does not react with the solution or the gas sample, rotating said partially immersed electrode at a substantially constant speed to form a thin continuous surface film of said reagent electrolyte solution covering the unimmersed surface of said rotatable electrode, concurrently passing said sample gas mixture stream in contact with said thin continuous surface film of reagent electrolyte solution to effect a change in the ionic content thereof and form a dynamic concentration cell having a liquid interface, measuring the potential developed between said rotatable electrode and said body of reagent electrolyte solution as an indication of the concentration of said selected constituent in said sample gas mixture; and continuously effecting the regeneration of said treated reagent electrolyte solution and recycling the regenerated reagent to said body of reagent electrolyte solution.

4. A method in accordance with claim 3 for measuring the oxygen gas content of a sample gas mixture, wherein said untreated reagent electrolyte solution comprises an ammoniacal ammonium chloride solution containing cuprous ammonium ions and wherein said treated reagent is regenerated by contacting metallic copper.

5. Apparatus for continuously measuring the concentration of a selected constituent in a sample gas mixture stream which comprises, cell block means having a closed chamber therein; a rotatable electrode partially immersed in a body of reagent electrolyte solution in said chamber, the composition of the electrode being such that it does not react with the solution or the gas sample; a stationary electrode of the same material immersed in said solution and positioned near the bottom of said chamber; means for rotating said partially immersed electrode at a substantially constant speed; sample gas inlet and outlet means positioned near the upper portion of said chamber for continuously passing said stream of sample gas mixture in contact with the unimmersed portion of said rotatable electrode; inlet and outlet reagent electrolyte solution conduit means for continuously circulating fresh reagent electrolyte solution to said chamber; electric circuit indicating means communicating with said electrodes, responsive to the potential developed across said electrodes, and calibrated to indicate the change in concentration of said selected constituent in said sample gas mixture.

6. Apparatus for continuously measuring the concentration of a selected constituent in a sample gas mixture stream which comprises, cell block means having a closed chamber therein; a rotatable electrode partially immersed in a body of reagent electrolyte solution in said chamber, the composition of the electrode being such that it is non-reactive with the solution and the gas sample; a stationary electrode of the same material immersed in said solution and positioned near the bottom of said chamber; means for rotating said partially immersed electrode at a substantially constant speed; sample gas inlet and outlet means positioned near the upper portion of said chamber for continuously passing said stream of sample gas mixture in contact with the unimmersed portion of said rotatable electrode; inlet and outlet reagent electroylte solution conduit means for continuously circulating fresh reagent electrolyte solution to said chamber; electric circuit indicating means communicating with said electrodes, responsive to the potential developed across said electrodes, and calibrated to indicate the change in concentration of said selected constituent and said sample gas mixture; means for effecting regeneration of said treated reagent electrolyte solution; and conduit means for recycling said regenerated reagent electroylte solution to said cell block means.

References Cited in the file of this patent
UNITED STATES PATENTS

| | | |
|---|---|---|
| 1,944,804 | Ornstein | June 23, 1934 |
| 2,156,693 | Jacobsen | May 2, 1939 |
| 2,289,610 | Wallace | July 14, 1942 |
| 2,401,287 | Yant et al. | May 28, 1946 |
| 2,508,238 | Fagen | May 16, 1950 |
| 2,517,382 | Brinker et al. | Aug. 1, 1950 |
| 2,585,059 | Wallace | Feb. 12, 1952 |